(12) United States Patent
Lassila et al.

(10) Patent No.: US 6,641,327 B1
(45) Date of Patent: Nov. 4, 2003

(54) WATER TURBINE ARRANGEMENT

(75) Inventors: Tommi Lassila, Espoo (FI); Risto Pakaste, Helsinki (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 09/600,582

(22) PCT Filed: Jan. 28, 1999

(86) PCT No.: PCT/FI99/00056

§ 371 (c)(1),
(2), (4) Date: Sep. 13, 2000

(87) PCT Pub. No.: WO99/39098

PCT Pub. Date: Aug. 5, 1999

(30) Foreign Application Priority Data

Jan. 28, 1998 (FI) .................................................. 980187

(51) Int. Cl.⁷ ............................. E02B 9/00; F03B 13/10
(52) U.S. Cl. ............................. 405/78; 405/75; 290/54; 60/398
(58) Field of Search ........................ 290/54, 93; 60/398; 415/3.1, 4.3, 4.5, 906, 908; 405/75, 76, 77, 78

(56) References Cited

U.S. PATENT DOCUMENTS

| | | |
|---|---|---|
| 3,535,540 A | 10/1970 | Boulogne |
| 4,073,146 A | 2/1978 | Atencio |
| 4,078,388 A | 3/1978 | Atencio |
| 4,143,990 A | 3/1979 | Atencio |
| 4,182,123 A * | 1/1980 | Ueda ............................. 405/78 |
| 4,261,171 A * | 4/1981 | Atencio ......................... 60/398 |
| 4,445,046 A * | 4/1984 | Allegre et al. ................. 290/43 |
| 4,697,984 A | 10/1987 | Takeuchi et al. |
| 4,868,408 A * | 9/1989 | Hesh ............................ 290/54 |

FOREIGN PATENT DOCUMENTS

| | | |
|---|---|---|
| FR | 2 571 101 | 4/1986 |
| GB | 833414 | 4/1960 |

* cited by examiner

Primary Examiner—Heather Shackelford
Assistant Examiner—Frederick L. Lagman
(74) Attorney, Agent, or Firm—Dykema Gossett PLLC

(57) ABSTRACT

A water turbine arrangement employs a generator enclosed in a cylindrical casing. A turbine is arranged directly on the generator shaft outside the casing. The casing is arranged to a flow conduit by a support structure which has a tubular support shaft arranged to carry the cylindrical casing in the flow conduit. The cylindrical casing and the tubular support shaft and the turbine are removable from the flow conduit as a single structure through an installation hole.

3 Claims, 1 Drawing Sheet

WATER TURBINE ARRANGEMENT

BACKGROUND OF THE INVENTION

The present invention relates to a water turbine arrangement comprising a generator enclosed in a cylindrical casing and a turbine arranged directly on a generator shaft, outside the casing, the casing being arranged to a flow conduit by means of a support structure comprising a tubular support shaft arranged to carry the cylindrical casing in the flow conduit.

Water turbines are commonly used for producing electric energy at power plants typically located at river beds or other places where the necessary water head or flow rate can be obtained. At water-power plants, a generator rotated by a water turbine converts kinetic or potential energy of water into electricity. The water flow acts on the turbine blades, thereby causing a rotating movement in the turbine and in the generator coupled to the turbine.

Prior art knows various different types of water turbines, suitable for water flows and heads of different sizes. The turbines differ from one another, for example, in the form of the turbine blades and their adjustability, and in the generator location and its installation position. The most commonly used generator is a synchronous machine directly connected to a network into which energy is to be supplied. The generator must then be made to rotate at a predetermined speed corresponding to synchronous speed determined by the network frequency and the generator's pole pair number. The correct rotation speed is most often obtained by means of a gearing arranged between the turbine and the generator, the gearing being conventionally used for increasing the rotation speed of the generator. Increased rotation speed allows the pole pair number and, at the same time, the diameter of the synchronous machine to be reduced. However, the gearing needed to change the rotation speed causes a significant portion of the power plant's losses. Moreover, the generator and the gearing require a cooling equipment for transferring the heat that is generated in the gearing. For practical reasons, the gearing must be located on the shaft coupling the generator and the turbine, therefore large plant premises are needed. In addition, for any servicing of the generator or the gearing, area for service aisles must be reserved at the plant.

With current arrangements, the costs of building water-power plants at dams are considerably high. A water turbine and the related components, such as the gearing and the generator, are also difficult to install to dam constructions. At some plants, the gearing and the generator directly connected to the network are both placed into the same cylindrical casing located in the flow conduit. An example of this solution is the bulb-generator. The casing enclosing the generator and the gearing is rather big, which means that the support structures carrying the casing also need to be big. There must also be enough room to allow any maintenance works to be carried out inside the casing.

In certain solutions, the generator and the gearing are placed outside the flow conduit, the flow conduit then incorporating only the turbine and the support structure carrying it. The turbine shaft must be applied through the wall of the flow conduit and sealed therein, the gear and the generator thus requiring separate premises at the plant construction, in the vicinity of the flow conduit.

The turbine must be installed into the flow conduit with great care, and it must be aligned precisely with the flow conduit. The installation is difficult-because the space where the turbine is to be placed is small, and the size and weight of the equipment to be installed is large.

BRIEF DESCRIPTION OF THE INVENTION

An object of the present invention is to provide a water turbine arrangement that avoids the above-mentioned shortcomings and simplifies the constructions of equipment associated with water-power plants, thereby facilitating installation works at the plants. This object is achieved with an arrangement of the invention characterized in that the cylindrical casing comprising the generator, together with the tubular support shaft and the turbine, are arranged to be removed from the flow conduit as a single piece through an installation hole.

The invention is based on the idea that the generator being enclosed in a casing which is carried by the support shaft and installed into the flow conduit in such a way that the turbine, which is coupled to the generator by means of a shaft, is positioned precisely in the flow conduit. The cylindrical casing only comprises the generator and parts directly relating thereto, the outer dimensions of the casing thus being as small as possible and the installation as simple as possible.

An advantage of the invention is that it considerably simplifies the installation of a water turbine arrangement. The installation can be carried out through an installation hole, with the turbine already coupled to the generator. Through the installation hole, the cylindrical casing comprising the generator can be aligned with the flow and the flow conduit into precisely right position. In addition, the tubular support shaft carrying the casing in the flow conduit is particularly well suited for housing the generator cabling and the generator cooling air ducts.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

Figure 1:
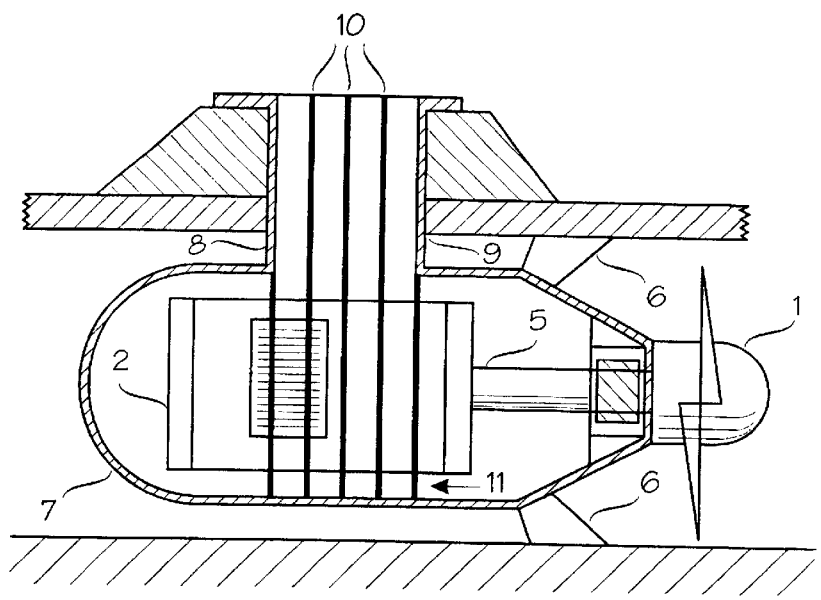
FIG. 1 illustrates a water turbine arrangement of the invention installed into a flow conduit.

As shown in FIG. 1, a generator 2 meant for the production of energy is placed inside a cylindrical casing 7, a turbine 1 coupled to a shaft 5 of the generator 2 being outside the casing. The shaft between the turbine and the generator is applied through the casing in a waterproof manner, so as to prevent the water flowing in the flow conduit from entering the casing. Before the casing is installed into the flow conduit, the generator is supported inside the casing and coupled to the turbine, the installation work being thus simplified. In addition, a tubular support shaft 8 carrying the casing in the flow conduit is attached to the casing. A water turbine unit comprising the abovementioned casing 7, generator 2, turbine 1 and turbine shaft 5, and the tubular support shaft 8, can be installed into the flow conduit as a single entity through an installation hole 9.

Figure 3:
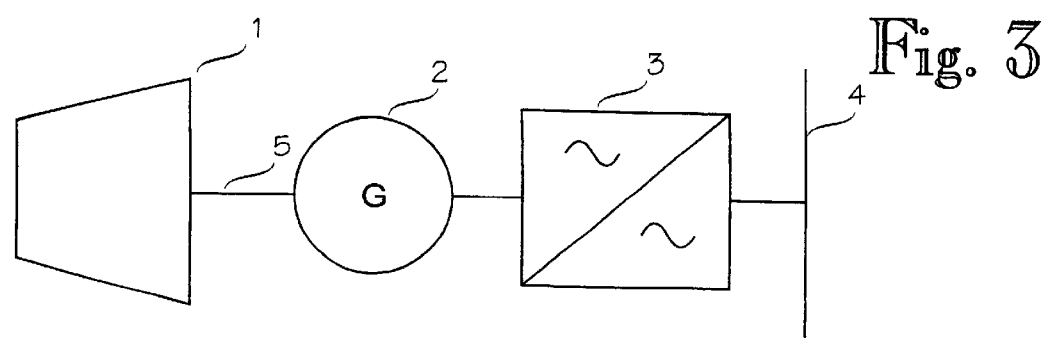
FIG. 3 is a block diagram illustrating the water turbine arrangement and components related thereto.

The generator enclosed in the casing 7, as shown in FIG. 3, produces an alternating voltage the frequency of which changes as the rotation speed of the turbine changes. Since the arrangement does not comprise a gearing, the turbine and the generator rotate at an equal speed. The variable-frequency alternating voltage is converted to an alternating voltage of a predetermined frequency in a frequency converter 3 to which the generator is cabled, as shown in FIG. 3. The frequency converter can be a cycloconverter, an electric power inverter or another suitable device. The voltage frequency produced by means of the frequency converter can be made to correspond to the frequency prevailing in a network 4 where the voltage is to be supplied to. After the electric power inverter, the level of the voltage is changed to a desired level by using a suitable converter, for example. When the nominal output of the water turbine unit is high, the generator 2 producing the alternating voltage is typically, due to structural reasons, a synchronous machine. In water turbine units having a smaller nominal output, an asynchronous machine can also be used as the generator.

The turbine type of the water turbine unit can be selected according to the application concerned, with water flow and head taken into account. Some turbine types comprise adjusting devices which can be used for adjusting the angle of the turbine blades in relation to the flow, thereby acting on the power to be produced. A propeller turbine, which has no adjustable turbine blades, is particularly well suited for the arrangement of the invention. Adjustable turbine 1 blades would provide a very modest benefit, because the rotation speed of the generator need not be synchronized with a particular speed. A device for adjusting the turbine 1 blades would, however, take up space unnecessarily, due to which the casing containing the generator would need to be made bigger. Consequently, a blade adjusting device would decrease the advantages provided by the arrangement of the invention.

Figure 2:
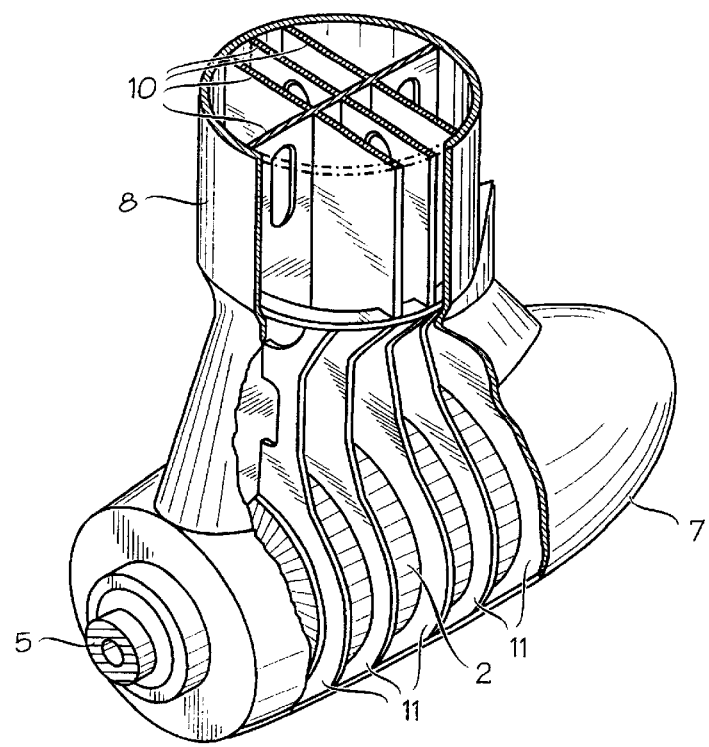
FIG. 2 illustrates a water turbine arrangement of the invention.

The water turbine arrangement of the invention comprises, as shown in FIG. 2, the tubular support shaft 8 attached to the cylindrical casing containing the generator, the support shaft being used to arrange the casing 7 into the flow conduit. The casing 7 is in the flow conduit carried only by the support shaft 8. The tubular support shaft comprises vertical support structures 10 stiffening the support shaft. In addition, the support structures 10 inside the support shaft provide ducts, as defined in the embodiment, used for supplying cooling air into the casing. Separate ducts are arranged to convey the air flow to the generator and away from the generator. The described cooling arrangement allows the generator to be cooled without a heat exchanger or liquid cooling needed in the casing, which, due to their size, would reduce the advantages of the invention.

According to one embodiment, the support structures inside the tubular support shaft 8 terminate fixedly at a stator of the generator. The support structures are attached to the generator stator by means of web plates 11 that rest on the cylindrical casing. The web plates surround the generator in a collar-like manner, thereby forming part of the generator stator structure. The web plates 11 thus attach the generator 2 in a reliable manner to the casing 7 and, at the same time, they reinforce the casing from the inside. The web plates that surround the generator also provide an extension of the support structures 10 of the support shaft 8 and to the air flow ducts formed by the support structures. The air flow supplied through the support shaft can thus be guided via the ducts provided by the web plates to surround the generator, thereby making the transfer of heat into the air flowing out of the generator more effective. The web plates are arranged so as to allow the air flow to also enter the air gap between the generator rotor and the stator. In addition to providing a transfer path for the cooling air, the support shaft also comprises paths for the cabling between the generator 2 and the frequency converter 3.

When required, by any maintenance or repair works, the water turbine unit can be removed as a single piece from the flow conduit through the installation hole 9, as defined in the invention. Consequently, the installation hole 9 is made big enough to allow the entire water turbine unit to be mounted and removed through one and the same hole. The installation hole can be provided with additional adjusting members arranged around the tubular support shaft 8 to support the support shaft and to tighten the junction between the installation hole and the support shaft. A support shaft end can also be shaped so that an additional adjusting member is not needed between the support shaft and the installation hole. The flow conduit can also be provided with an installation hole comprising a hatch-like construction that can be opened to allow the turbine unit to be then freely mounted to or removed from its place.

On the outer surface of the support shaft 8, and particularly on the portion of the surface located inside the flow conduit, can be attached a form part that makes the support shaft hydrodynamically more advantageous in that extra whirl disturbing the maximal use of the turbine does not emerge in the water flow in the flow conduit. The cylindrical casing 7 itself is, naturally, also made as streamlined as possible.

To allow full benefit to be gained from the water flow, the turbine must be precisely aligned with the flow conduit. Since the structure is light, the alignment is simpler than when prior art water turbine solutions are used. A water turbine is typically installed to have either a vertical or a horizontal shaft. The turbine arrangement of the invention, however, can be installed in any thinkable position, including not only the vertical and the horizontal, but also all intermediate positions. The turbine unit can thus be aligned with the flow conduit at every point of the conduit, also when the flow conduit is not horizontal.

As shown in FIG. 1, one embodiment comprises control wings arranged between the exterior of the cylindrical casing 7 and the wall of the flow conduit, the control wings allowing the water flow in the flow conduit to be suitably guided to gain a maximal benefit from the flow. In the embodiment in question, water flows in a direction in which it first meets the control wings arranged to the casing 7, and then the turbine 1. The turbine can also be designed to operate in a flow running in an other direction of flow, in which case the turbine comes before the casing 7. Some water turbine arrangements comprise adjustable control wings which allow the flow and its power impact on the turbine to be adjusted. In the arrangement of the invention, the adjusting of the control wings does not provide any additional benefit, because the rotation speed of the generator and the turbine are automatically adjusted to correspond to the generator load and the flow. The control wings are meant to provide whirl in the water flow to increase the torque generated by the turbine.

It is apparent to a person skilled in the art that as technology advances, the basic idea of the invention can be implemented in various ways. The invention and its embodiments are therefore not restricted to the above described examples but they may vary within the scope of the claims.

What is claimed is:

1. A water turbine arrangement comprising a generator enclosed in a cylindrical casing and a turbine arranged directly on a generator shaft outside the casing, the casing being arranged to be located in a flow conduit by means of a support structure comprising a tubular support shaft arranged to carry the cylindrical casing in the flow conduit, wherein the cylindrical casing, the generator, together with the tubular support shaft and the turbine, are arranged to be removed from the flow conduit as a single entity through an installation hole, the tubular support shaft comprising vertical support structures that form air flow ducts arranged to convey cooling air into and out of the casing containing the generator.

2. An arrangement according to claim 1, wherein the vertical support structures of the tubular support shaft are arranged to connect to web plates fixedly attached to a stator of the generator.

3. A water turbine arrangement adapted to be located in a flow channel having an installation hole therein comprising:

a cylindrical casting;

a generator located in the cylindrical casting;

a generator shaft coupled to the generator and having a free end extending outside of the casing;

a turbine secured to the free end of the shaft;

a tubular support shaft secured to the cylindrical casing for engaging the flow channel through the installation hole, said tubular support shaft having air flow ducts arranged to convey cooling air into and out of the casing, and wherein the cylindrical casing, the generator, the tubular support shaft and the turbine are arranged to be removed from the flow conduit as a single entity through the installation hole.

* * * * *